United States Patent Office 3,160,240
Patented Dec. 8, 1964

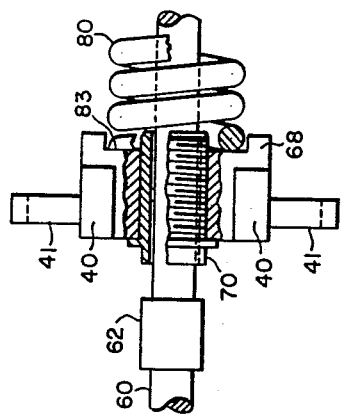
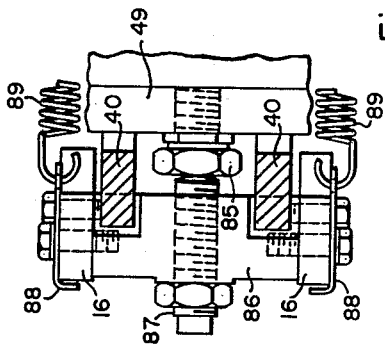
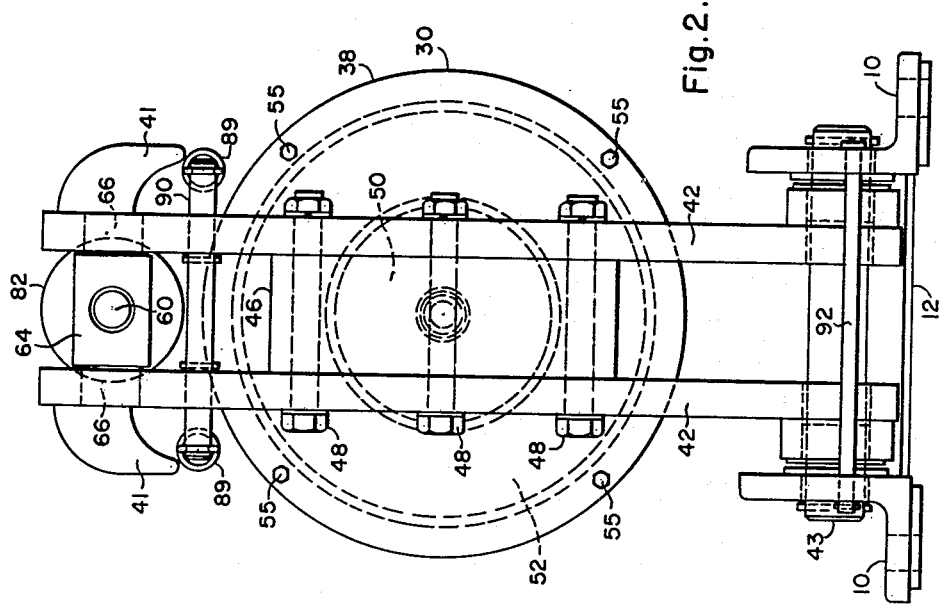

3,160,240
ELECTROMAGNETIC BRAKE
William R. Harding, Sr., Blacksburg, Va., and Gerald T. Benzinger, Orchard Park, and Edward J. Lewandowski, Depew, N.Y., assignors to Westinghouse Electric Corporation, East Pittsburgh, Pa., a corporation of Pennsylvania
Filed May 28, 1962, Ser. No. 197,973
9 Claims. (Cl. 188—171)

This invention relates generally to brakes and, more particularly, to a two-shoe electromagnetic brake having an operating linkage for enabling both shoes to be jointly spring-applied to the brake wheel and electromagnetically released.

The invention is illustrated in a preferred embodiment in connection with an electric brake of the double block type in which a spring applies the braking torque and a solenoid or electromagnet operating against the spring or braking torque, moves the brake to disengaged position.

In the usual case, double block brakes comprise a brake wheel and have brake arms on opposite sides of the brake wheel, which carry the brake shoes. The brake is set by a compression spring in a linkage system connecting the free extremities of the brake arms. This forces the brake arms together, and the brake is usually released by energizing the electromagnet which operates the linkage against the spring or braking torque. Most brakes of this general type have three adjustments; one for varying the torque and hence for varying the spring compression, one for equalizing the shoe clearances, usually by means of separate adjustments on the shoes, and the third for adjusting the stroke or travel of the solenoid or electromagnet plunger or armature.

While these adjustments may vary for different types of brakes, they are essentially the same. In a typical case, after the brake is mounted in position it is necessary to make most, and usually all of these adjustments, and the successful operation of the brake depends upon the care and accuracy with which these adjustments are made. Initial adjustments, however, hold only for the initial thickness of the brake shoe lining. As the brake is used the lining becomes worn and the brake is continuously moving out of adjustment. When the lining has worn an amount equal to the initial shoe clearances, the travel of the armature or solenoid plunger has been doubled, and it is usually necessary to readjust the brake to restore the travel to its original distance.

Therefore, it is desirable to provide a structure which renders the effecting of these adjustments as simple as possible. Thus, it is desirable to have the adjusting mechanism at a readily accessible location and to design the linkage in such a manner that a minimum number of adjustments or adjusting points are required.

It is also sometimes necessary in the normal operation of a brake of this type to remove and replace parts, as for example the brake shoes which from time to time must be replaced or relined. It may from time to time be necessary to replace or repair a magnet or a coil. The linkage itself may occasionally have to be removed and repaired or replaced. Consequently, it is desirable that these parts be readily accessible for easy and quick replacement. These electromagnetic brakes are used in many industrial applications such as for slowing down, stopping and holding electric motor driven equipment such as steel mill drives, cranes, hoists, movable bridges, conveyors and similar service, and it is necessary to keep any time when the brake is out of service to a minimum.

It would also be desirable to have a brake of this kind in which parts could be removed and repaired or replaced without releasing the brake shoes. For example, if a coil should burn out, it would be desirable to be able to replace such a coil without releasing the brake shoe, so that a load could be held during the repair operation.

In view of the foregoing, the principal object of the present invention is to provide an improved brake of simple and economical but rugged construction with improved and easily accessible adjustment means.

Another object of the invention is to provide a new and improved brake having a readily accessible unitized linkage assembly which can easily be removed to facilitate replacement of parts.

A further object of the invention is to provide an improved electromagnetic brake having improved electromagnet construction in which the magnet coils can be removed and replaced without releasing the brake shoes.

A still further object of the invention is to provide an improved electromagnetic brake having an improved twin magnet construction which provides better operation and improved cooling of the magnet coils.

Other objects and advantages of the invention will be apparent from the following detailed description, taken in connection with the accompanying drawing, in which:

FIG. 2 is an end view of the brake;

FIG. 3 is a fragmentary plan view of a portion of FIG. 1 substantially on the line III—III; and, FIG. 4 is a view substantially on the line IV—IV of FIG. 1.

Figure 1:
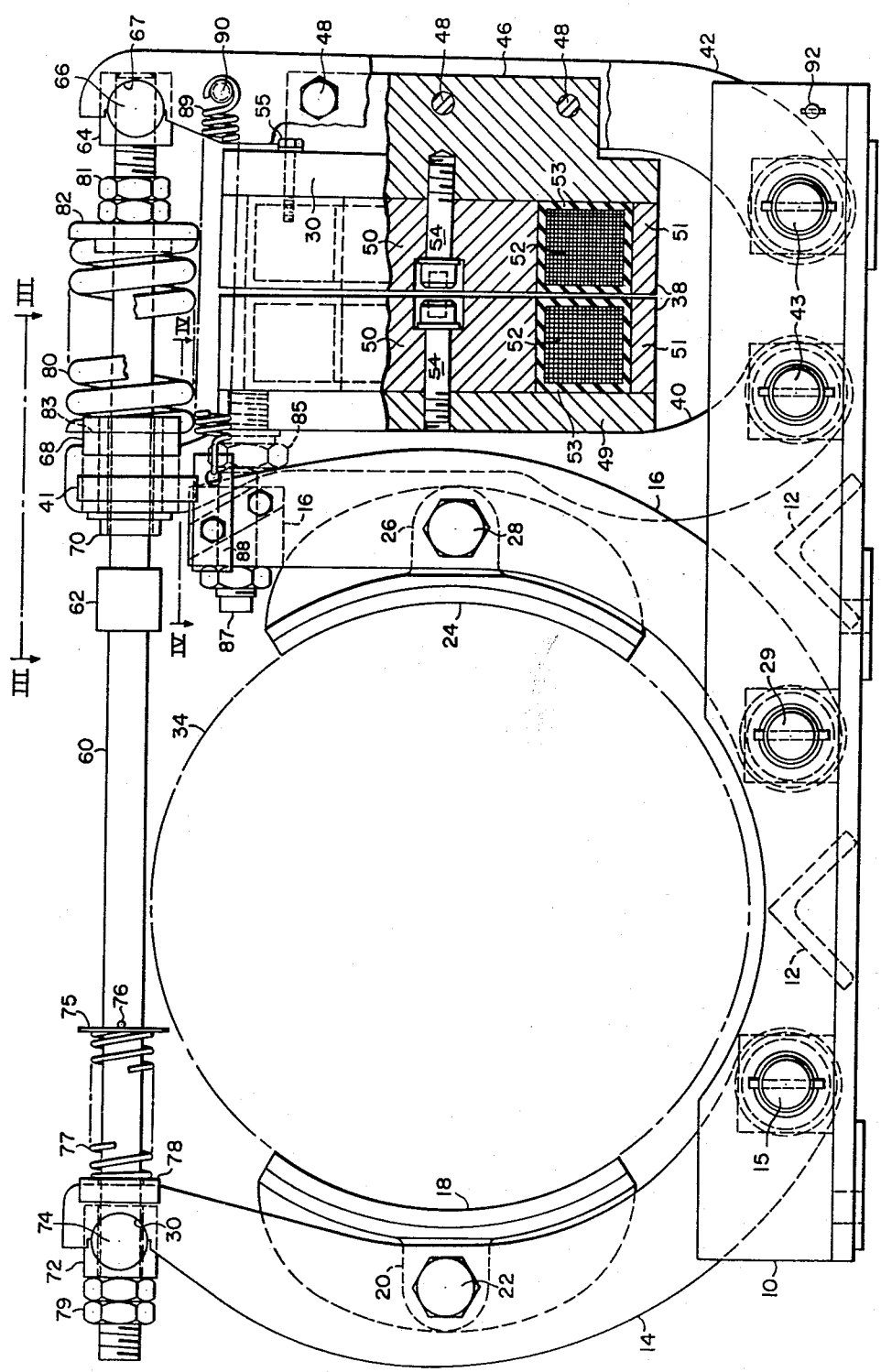
FIGURE 1 is a side elevation of a brake embodying the invention.

Briefly, the brake as described in greater detail hereinafter, comprises a base or support, and a pair of brake arms pivotally mounted on said base or support on either side of a brake wheel or drum which is adapted to be mounted on a rotating shaft. At one side of the brake arms is mounted a pair of clapper type electromagnets in face to face opposed relationship for mutual attraction. A tie rod overlies the brake wheel and magnets and is secured at one end to the outer brake arms and at its other end to a magnet clapper arm. The brake arms are pivotally supported and spring-biased in such a manner as to apply braking torque when the magnets are deenergized, and to release the brake shoes from the brake wheel when the magnets are energized. The linkage connecting the magnets and brake shoes is a unitized assembly which includes springs and bearing trunnions on a single removable tie rod.

Referring now to the drawing, the support or base may comprise a pair of spaced parallel angles 10, spaced apart and secured together by tie members 12. The brake assembly includes two brake arms 14 and 16 of generally similar construction. Brake arm 14 is pivoted to the base between the angles 10 adjacent the left end of the base on a bearing pin 15 extending through the angles 10. The brake arm 14 consists of two identical members spaced apart by a brake shoe 18, pivotally mounted between them by means of a lug 20 on the brake shoe and a bolt 22. Each of the two members forming the brake arms 14 has at the upper end a recess portion 30 opening toward the side of the brake arm remote from the brake shoe. These recesses form half bearings for a purpose to be described hereinafter.

The brake arm 16 is constructed similarly to the brake arm 14 and comprises a pair of identical members having a brake shoe 24 pivotally mounted between them by means of a lug 26 and a bolt 28. The brake arm 16 is pivotally mounted between the angles 10 on a bearing pin 29. A brake wheel 34 is provided for engagement by the brake shoes 18 and 24 and may be of any suitable construction for mounting on the shaft of a motor or other rotating equipment which is to be braked.

The magnet assembly for releasing the brake is a clapper type twin magnet assembly having a pair of magnets 38 in face to face relation. The magnets 38 are mounted at the right end of the base, as viewed in the drawing, on clapper arms 40 and 42, pivotally mounted on the base on bearing pins 43. The clapper arm 42 comprises a pair of identical members, as shown in FIG. 2, which are spaced apart by a block 46 and secured together by bolts 48 passing through the block 46. The block 46 is attached to or integral with a circular plate 30 of magnetic material.

The clapper arm 40 may be generally similar to the clapper arm 42 and comprises two identical members spaced apart by a block similar to the block 46 which is secured between the two members of the clapper arm 40 and which may be integral with a circular plate 49 of magnetic material. The overall width of the clapper arm 40 is made slightly less than the spacing between the members of the brake arm 16, as shown in FIG. 4, so that the clapper arm 40 can move freely between the members of the brake arm. The upper ends of the two members of the clapper arm 40 may be provided with lifting lugs 41.

The two magnets 38 are identical and each consists of a central core 50 and an outer ring 51, both of magnetic material. A coil 52 is disposed between the core and outer ring and encapsulated in a suitable resin, such as an epoxy resin, indicated at 53. The resin bonds the coil to the core and outer ring to make a unitary magnet structure, and encapsulates the coil for protection against dirt, water, oil or other harmful contaminants. The magnets 38 are removably mounted on the plates 30 and 49 by means of central bolts 54 passing through the cores 50 and threaded into the respective plates and by small screws 55 passing through the plates and threaded into the outer rings 51. It will be seen that the plates 30 and 49 complete the magnetic circuit and that when the coils are energized, the magnets attract each other and move the clapper arms 40 and 42 toward each other.

The linkage or operating means for actuating the brake arms includes a tie rod 60 which is approximately coextensive with the base. The tie rod 60 is threaded at each end and has an enlarged portion 62 forming a shoulder intermediate its ends. A trunnion block 64 is threaded on the rod 60 at the end adjacent the magnet assembly and has trunnions 66 extending from each side thereof. The trunnions 66 are received in recesses or half bearings 67 at the upper ends of the two members of the clapper arm 42. A second trunnion block 68 is received on the tie rod 60 intermediate the enlarged portion 62 and the trunnion block 64. The trunnion block 68 has shoulders at each side adapted to engage the upper ends of the two members of clapper arm 40, as shown in FIG. 3. The trunnion block 68 is internally threaded and bushing 70 is threaded into the trunnion block. The tie rod 60 passes through the bushing 70 and is freely slidable therein.

A third trunnion block 72 is slidably placed on the left end of the tie rod 60 and has cylindrical trunnions 74 extending from each side thereof which are received in the recesses 30 formed in the brake arm 14. A washer 75 is placed on the tie rod 60 inwardly of the trunnion block 72 and is positioned by a pin 76 to form a stop. A compression spring 77 extends between the washer 75 and a plate 78 which bears against the end of the brake arm 14. A lock nut 79 is threaded on the end of the tie rod 60 to bear against the trunnion block 72, thus holding it against the force of the spring 77 and positioning the block 72 relative to the tie rod.

Spring force for providing braking torque is provided by a main compression spring 80 on the tie rod 60. A lock nut 81 is threaded on the tie rod adjacent the right end and a circular spring retainer 82 is slidably placed on the tie rod to bear against the nut 81. The spring 80 is placed on the tie rod with one end bearing against the retainer 82 and the other end seated in a circular recess 83 in the trunnion block 68. The spring 80 therefore applies a force to the block 68 which, as previously explained, is slidable on the tie rod 60 and bears against the clapper arm 40.

An abutment or stop member 85, which may be a bolt, is threaded into the upper part of the clapper plate 49 and extends into the space between the members of the clapper arm 40, as shown in FIG. 4. A block 86 is bolted between the members of the brake arm 16 at the top thereof, and a screw 87 is threaded through the block 86 in position to engage the stop member 85. A plate 88 is attached to the brake arm 16 at each side and a tension spring 89 is hooked into a hole in each of the plates 88. The other end of each of the springs 89 is attached to a pin 90 which extends through the clapper arm 42. The springs 89 thus hold the screw 87 against the stop 85 and the position of the brake arm 16 is adjustable by means of the screw 87.

The operation of the brake is as follows. When the magnets 38 are denergized, the brake is applied by the main compression spring 80. This spring is compressed between the retainer 82, which is fixed in position on the tie rod 60 by the nut 81, and the trunnion block 68. The spring 80 therefore tends to force the tie rod toward the right and the block 68 toward the left. The tie rod therefore pulls the brake arm 14 to the right and forces the brake shoe 18 against the brake wheel. At the same time, the block 68 moves the clapper arm 40 to the left and moves the brake arm 16 toward the brake wheel by engagement of the stop 85 with the screw 87, forcing the brake shoe 24 against the wheel. The brake is thus applied with a braking force determined by the compression of the spring 80 which may be adjusted by means of the nut 81, and the geometry of the linkage is made such that the forces applied to both brake shoes are equal.

To release the brake, the magnets 38 are energized. The magnetic attraction pulls the twin magnets together moving the clapper arms 40 and 42 toward each other. The clapper arm 42 moves the tie rod 60 to the left, compressing the spring 80 against the block 68, and thus moves the brake arm 14 and brake shoe 18 away from the wheel. At the same time, the clapper arm 40 moves to the right permitting the brake arm 16 and brake shoe 24 to be moved away from the wheel by the tension springs 89.

The necessary adjustments of the brake and any necessary repairs and maintenance are easily accomplished. In normal service the only adjustments necessary are to compensate for wear of the brake shoe linings. This is readily done by means of the nut 79 to change the position of the trunnion block 72 with respect to the tie rod and thus move the brake shoe 18 toward or away from the wheel as required. The position of the brake shoe 24 relative to the wheel is adjusted by means of the screw 87 which determines the position of the brake arm 16. The nut 79 and screw 87 are both easily accessible and the necessary adjustments to compensate for wear are easily made. The compression of the main spring 80 is initially adjusted to provide the desired braking torque and normally no further adjustment is required. If such adjustment should become necessary, however, it can easily be made by means of the nut 81 which is easily accessible.

It is sometimes necessary or desirable to release the brake manually for repair or maintenance purposes. This is easily done by turning the bushing 70 to thread it out of the block 68. The bushing 70 is turned until it engages the fixed shoulder 62 on the tie rod 60. Further turning of the bushing 70 then causes it to jack the block 68 to the right, compressing the spring 80 between the fixed shoulder 62 and fixed retainer 82, and releasing the spring pressure on the clapper arm 40. The brake is thus released and the tie rod 60 can then, if desired, be disengaged from the brake arm 14 by backing off the nut 79 sufficiently to permit the trunnions 74 to be disengaged. The tie rod can then be swung up out of the way by pivoting it about the trunnions 66 or, if desired, it may be removed entirely.

With the tie rod out of the way, any necessary repair or maintenance operation can easily be performed. For example, it is necessary from time to time to replace or reline the brake shoes after considerable wear has occurred. With the brake manually released and the tie rod moved out of the way or removed, the brake arm 14 can be rotated about its pivot far enough to permit the brake shoe 18 to be remove and replaced. Similarly, the brake shoe 24 can be moved by taking out the bolt 28 and sliding the brake shoe around the wheel. After replacement of the brake shoes and any other repair or maintenance operations, the tie rod is replaced in its normal position and the brake is restored to normal operation by turning the bushing 70 to thread it back into the block 68, thus reapplying the spring pressure to the block to apply the brake as previously described.

The twin magnet construction has many advantages. The magnet coils can be connected either in series or in parallel, providing considerable flexibility in application, and the construction is such that leakage flux is reduced to a minimum and maximum cooling of the coils is obtained. Thus the brake is very efficient in normal operation. If one of the coils should burn out or be damaged, it is possible to operate the brake with only one coil for a limited time if necessary. The twin magnet construction also has the advantage that either or both magnets may be removed and replaced without releasing the brake. Thus, with the brake applied, the magnets can be removed simply by removing the stop pin 92, which is provided to normally limit movement of the clapper arm 42, and unhooking the tension springs 89 from the pin 90. The arm 42 can then be rotated about its pivot to drop down to a generally horizontal position and the magnet can be removed from the plate 30 by removing the bolt 54 and the screws 55. The other magnet can similarly be removed from the plate 49. After replacement of the magnets, it is only necessary to swing the arm 40 up to its normal position and attach the springs 89 to the pin 90. Thus, the magnets can easily be replaced if necessary without releasing the brake.

It will now be apparent that an improved brake construction has been provided which has many advantages. The construction is relatively simple and very rugged. All adjustments are made at easily accessible points because of the unitized tie rod and spring assembly which extends over the brake wheel for easy accessibility. The ease of removal of the tie rod assembly greatly facilitates maintenance operations such as replacement of the brake shoes. The twin magnet construction is also advantageous both because of its efficiency and because it permits replacement of either or both magnets without releasing the brake.

A preferred embodiment of the invention has been shown and described, for the purpose of illustration, but it will be apparent that various modifications and other embodiments are possible within the scope of the invention.

We claim as our invention:

1. A brake assembly comprising a brake wheel, brake arms pivotally mounted on opposite sides of the brake wheel and carrying brake shoes for engagement with the brake wheel, first and second clapper arms pivotally mounted for movement toward and away from each other, the first clapper arm being mounted adjacent one of said brake arms for engagement therewith, a tie rod extending transversely of the brake wheel and engaging the other of said brake arms, spring means carried on the tie rod and engaging said first clapper arm, said spring means being compressed between the first clapper arm and abutment means on the tie rod to urge the tie rod and first clapper arm in opposite directions to effect movement of the brake arms toward the brake wheel to apply the brake shoes thereto, said second clapper arm engaging the tie rod, and magnet means for effecting movement of the clapper arms toward each other to effect movement of the tie rod and first clapper arm to move the brake arms away from the brake wheel.

2. A brake assembly comprising a brake wheel, brake arms pivotally mounted on opposite sides of the brake wheel and carrying brake shoes for engagement with the brake wheel, first and second clapper arms pivotally mounted for movement toward and away from each other, the first clapper arm being mounted adjacent one of said brake arms for engagement therewith, a tie rod extending transversely of the brake wheel and engaging the other of said brake arms, spring means carried on the tie rod and engaging said first clapper arm, said spring means being compressed between the first clapper arm and abutment means on the tie rod to urge the tie rod and first clapper arm in opposite directions to effect movement of the brake arms toward the brake wheel to apply the brake shoes thereto, said second clapper arm engaging the tie rod, resilient means normally holding the second clapper arm in engagement with the tie rod, said resilient means being releasable to permit the second clapper arm to be moved away from the first clapper arm, and magnet means for effecting movement of the clapper arms toward each other to effect movement of the tie rod and first clapper arm to move the brake arms away from the brake wheel.

3. A brake assembly comprising a brake wheel, brake arms pivotally mounted on opposite sides of the brake wheel and carrying brake shoes for engagement with the brake wheel, first and second clapper arms pivotally mounted for movement toward and away from each other, the first clapper arm being mounted adjacent one of said brake arms for engagement therewith, a tie rod extending transversely of the brake wheel and engaging the other of said brake arms, spring means carried on the tie rod and engaging said first clapper arm, said spring means being compressed between the first clapper arm and abutment means on the tie rod to urge the tie rod and first clapper arm in opposite directions to effect movement of the brake arms toward the brake wheel to apply the brake shoes thereto, said second clapper arm engaging the tie rod, second spring means resiliently connecting said one brake arm and the second clapper arm to hold the one brake arm in engagement with the first clapper arm and the second clapper arm in engagement with the tie rod, said second spring means being releasable from the second clapper arm to permit the second clapper arm to be moved away from the first clapper arm, and magnet means for effecting movement of the clapper arms toward each other to effect movement of the tie rod and first clapper arm to move the brake arms away from the brake wheel.

4. A brake assembly comprising a brake wheel, brake arms pivotally mounted on opposite sides of the brake wheel and carrying brake shoes for engagement with the brake wheel, first and second clapper arms pivotally mounted for movement toward and away from each other, the first clapper arm being mounted adjacent one of said brake arms for engagement therewith, a tie rod extending transversely of the brake wheel and engaging the other of said brake arms, spring means carried on the tie rod and engaging said first clapper arm, said spring means being compressed between the first clapper arm and abutment means on the tie rod to urge the tie rod and first clapper arm in opposite directions to effect movement of the brake arms toward the brake wheel to apply the brake shoes thereto, means on the tie rod for releasing the first clapper arm from the spring means and holding the spring means compressed against the abutment means, said second clapper arm engaging the tie rod, and magnet means for effecting movement of the clapper arms toward each other to effect movement of the tie rod and first clapper arm to move the brake arms away from the brake wheel.

5. A brake assembly comprising a brake wheel, brake arms pivotally mounted on opposite sides of the brake wheel and carrying brake shoes for engagement with the brake wheel, first and second clapper arms pivotally mounted for movement toward and away from each other, the first clapper arm being mounted adjacent one of said brake arms for engagement therewith, a tie rod extending transversely of the brake wheel and engaging the other of said brake arms, spring means carried on the tie rod and engaging said first clapper arm, said spring means being compressed between the first clapper arm and abutment means on the tie rod to urge the tie rod and first clapper arm in opposite directions to effect movement of the brake arms toward the brake wheel to apply the brake shoes thereto, movable abutment means slidably carried on the tie rod between the first clapper arm and the spring means, means for moving said movable abutment means away from the first clapper arm to hold the spring means compressed between the movable abutment means and the first-mentioned abutment means, whereby the first clapper arm is released from the spring force, said second clapper arm engaging the tie rod, and magnet means for effecting movement of the clapper arms toward each other to effect movement of the tie rod and first clapper arm to move the brake arms away from the brake wheel.

6. A brake assembly comprising a brake wheel, brake arms pivotally mounted on opposite sides of the brake wheel and carrying brake shoes for engagement with the brake wheel, first and second clapper arms pivotally mounted for movement toward and away from each other, the first clapper arm being mounted adjacent one of said brake arms for engagement therewith, a tie rod extending transversely of the brake wheel and engaging the other of said brake arms, spring means carried on the tie rod and engaging said first clapper arm, said spring means being compressed between the first clapper arm and abutment means on the tie rod to urge the tie rod and first clapper arm in opposite directions to effect movement of the brake arms toward the brake wheel to apply the brake shoes thereto, said second clapper arm engaging the tie rod, and a pair of substantially identical magnet means, said magnet means being mounted on the first and second clapper arms in opposed positions for mutual attraction when energized to effect movement of the clapper arms toward each other for effecting movement of the tie rod and first clapper arm to move the brake arms away from the brake wheel.

7. A brake assembly comprising a brake wheel, brake arms pivotally mounted on opposite sides of the brake wheel and carrying brake shoes for engagement with the brake wheel, first and second clapper arms pivotally mounted for movement toward and away from each other, the first clapper arm being mounted adjacent one of said brake arms for engagement therewith, a tie rod extending transversely of the brake wheel and engaging the other of said brake arms, spring means carried on the tie rod and engaging said first clapper arm, said spring means being compressed between the first clapper arm and abutment means on the tie rod to urge the tie rod and first clapper arm in opposite directions to effect movement of the brake arms toward the brake wheel to apply the brake shoes thereto, said second clapper arm engaging the tie rod, resilient means normally holding the second clapper arm in engagement with the tie rod, said resilient means being releasable to permit the second clapper arm to be moved away from the first clapper arm, and a pair of substantially identical magnet means, said magnet means being mounted on the first and second clapper arms in opposed positions for mutual attraction when energized to effect movement of the clapper arms toward each other for effecting movement of the tie rod and first clapper arm to move the brake arms away from the brake wheel.

8. A brake assembly comprising a brake wheel, brake arms pivotally mounted on opposite sides of the brake wheel and carrying brake shoes for engagement with the brake wheel, first and second clapper arms pivotally mounted for movement toward and away from each other, the first clapper arm being mounted adjacent one of said brake arms for engagement therewith, a tie rod extending transversely of the brake wheel and engaging the other of said brake arms, spring means carried on the tie rod and engaging said first clapper arm, said spring means being compressed between the first clapper arm and abutment means on the tie rod to urge the tie rod and first clapper arm in opposite directions to effect movement of the brake arms toward the brake wheel to apply the brake shoes thereto, means on the tie rod for releasing the first clapper arm from the spring means and holding the spring means compressed against the abutment means, said second clapper arm engaging the tie rod, and a pair of substantially identical magnet means, said magnet means being mounted on the first and second clapper arms in opposed positions for mutual attraction when energized to effect movement of the clapper arms toward each other for effecting movement of the tie rod and first clapper arm to move the brake arms away from the brake wheel.

9. A brake assembly comprising a brake wheel, brake arms pivotally mounted on opposite sides of the brake wheel and carrying brake shoes for engagement with the brake wheel, first and second clapper arms pivotally mounted for movement toward and away from each other, the first clapper arm being mounted adjacent one of said brake arms for engagement therewith, a tie rod extending transversely of the brake wheel and engaging the other of said brake arms, spring means carried on the tie rod and engaging said first clapper arm, said spring means being compressed between the first clapper arm and abutment means on the tie rod to urge the tie rod and first clapper arm in opposite directions to effect movement of the brake arms toward the brake wheel to apply the brake shoes thereto, said second clapper arm engaging the tie rod, second spring means resiliently connecting said one brake arm and the second clapper arm to hold the one brake arm in engagement with the first clapper arm and the second clapper arm in engagement with the tie rod, said second spring means being releasable from the second clapper arm to permit the second clapper arm to be moved away from the first clapper arm, movable abutment means slidably carried on the tie rod between the first clapper arm and the spring means, means for moving said movable abutment means away from the first clapper arm to hold the spring means compressed between the movable abutment means and the first-mentioned abutment means, whereby the first clapper arm is released from the spring force, and a pair of substantially identical magnet means, said magnet means being mounted on the first and second clapper arms in opposed positions for mutual attraction when energized to effect movement of the clapper arms toward each other for effecting movement of the tie rod and first clapper arm to move the brake arm away from the brake wheel.

References Cited in the file of this patent
UNITED STATES PATENTS

| 1,557,465 | Mitchell | Oct. 13, 1925 |
| 2,925,153 | Hodgson | Feb. 16, 1960 |